United States Patent [19]
Frikton

[11] Patent Number: 4,733,497
[45] Date of Patent: Mar. 29, 1988

[54] APPLICATOR FOR AGRICULTURAL AND HORTICULTURAL TREATING LIQUIDS

[76] Inventor: George Frikton, P.O. Box 148, Maleny, Queensland, 4552, Australia

[21] Appl. No.: 912,245
[22] PCT Filed: Dec. 19, 1985
[86] PCT No.: PCT/AU85/00320
§ 371 Date: Aug. 18, 1986
§ 102(e) Date: Aug. 18, 1986
[87] PCT Pub. No.: WO86/03653
PCT Pub. Date: Jul. 3, 1986

[30] Foreign Application Priority Data
Dec. 21, 1984 [AU] Australia .............................. PG8680
Nov. 13, 1985 [AU] Australia ............................ 49939/85

[51] Int. Cl.$^4$ ............................................. A01G 13/00
[52] U.S. Cl. ........................................ 47/1.5; 47/1.7
[58] Field of Search .................. 47/1.5, 1.7; 239/145, 239/172

[56] References Cited
U.S. PATENT DOCUMENTS

| | | | |
|---|---|---|---|
| 1,764,952 | 6/1930 | Hay | 47/1.7 |
| 3,535,822 | 10/1970 | Fruth et al. | 47/1.5 |
| 4,291,492 | 9/1981 | Reynolds et al. | 47/1.7 |
| 4,403,881 | 9/1983 | Keeton | 47/1.5 |
| 4,443,970 | 4/1984 | Randolph | 47/1.5 |
| 4,471,570 | 9/1984 | Chandler | 47/1.5 |
| 4,592,164 | 6/1986 | Ballu | 47/1.5 |

FOREIGN PATENT DOCUMENTS 2531837 2/1984 France .................................. 47/1.5

Primary Examiner—Robert A. Hafer
Assistant Examiner—Bradley M. Lewis
Attorney, Agent, or Firm—Larson and Taylor

[57] ABSTRACT

An applicator for weedicide or other agricultural or horticultural treating liquid consists mainly of a swabbing brush having a multiplicity of pliant filaments, preferably of cruciform cross-section, trailing from a supply conduit to which the treating liquid is fed from a tank, the supply conduit which may be tractor-mounted being advanced over an area to be treated, so that the brush filaments with treating liquid running down them, are tailed over the area so that the liquid is applied directly to the area being treated. The swabbing brush, when tractor-mounted, is pivoted to swing back if encountering a tree or other obstacle, to be returned by a spring when the obstacle is passed.

10 Claims, 7 Drawing Figures

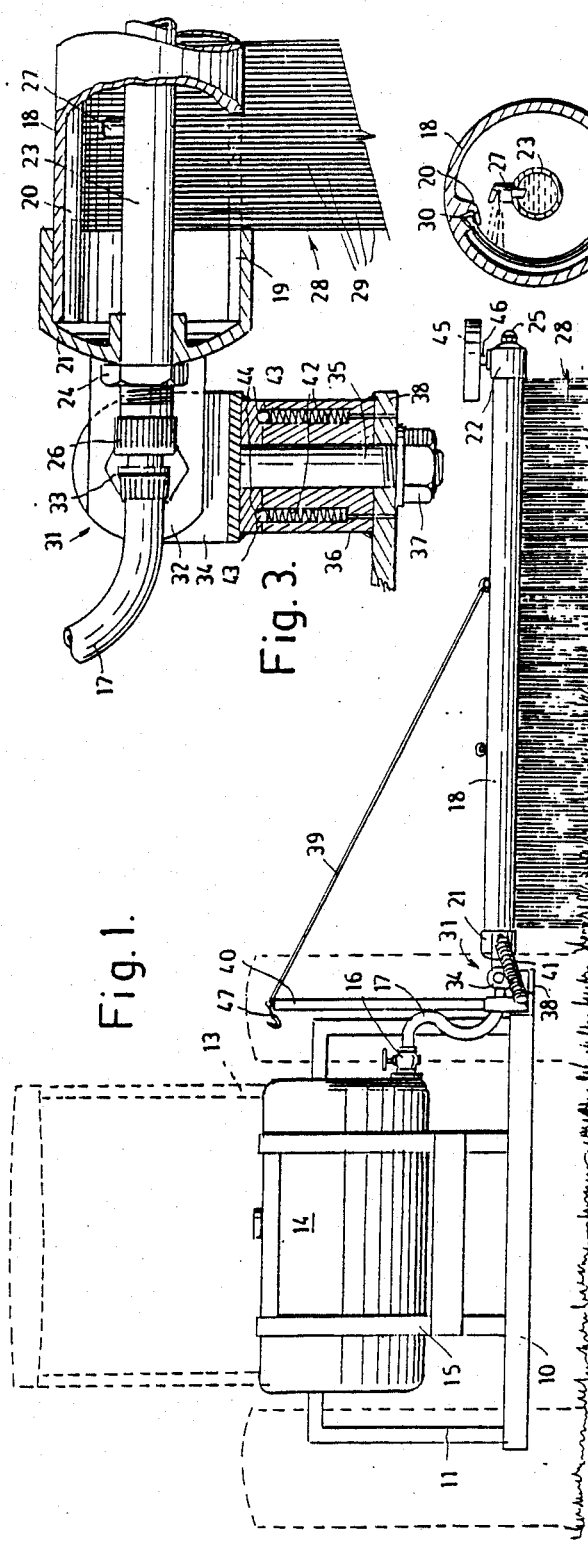

APPLICATOR FOR AGRICULTURAL AND HORTICULTURAL TREATING LIQUIDS

BACKGROUND OF THE INVENTION (1) Field of the Invention

This invention relates to an applicator for agricultural and horticultural treating liquids.

(2) Prior Art

Great care is required in the spraying of various agricultural and horticultural compounds, which though highly effective in the functions they are required to perform, such as controlling or eradicating weed growth, are also, in many cases, toxic. In addition to the health hazards such substances present to users, there is also the danger that they may be accidentally sprayed, or blown by wind, onto crops which may be harmed as a result.

SUMMARY OF THE PRESENT INVENTION

The present invention has been devised with the general object of providing apparatus for applying such treating liquids efficiently, with reduced danger of the substances becoming air-borne and inhaled by a user or of being misdirected onto crops.

With the foregoing and other objects in view the invention resides broadly in an applicator for agricultural and horticultural treating liquids including a supply conduit; feed means for feeding the treating liquid to the supply conduit and thence to the swabbing brush; and means for propelling the supply conduit over an area to be treated so that the swabbing brush trails fromt the supply conduit and deposits liquid from the brush to the area. The swabbing brush preferably comprises a multiplicity of pliant filaments trailing from a transverse opening in the lower part of the supply conduit. The supply conduit may be a tube with one end connected by a universal joint to one side of a tractor-mounted base frame, the conduit normally extending laterally but capable of being deflected, against spring-loading, to the front or rear, and capable of being raised from a normal substantially horizontal position to a raised travelling position. The feed means may include a tank for the liquid carried by the base frame and connected, through a control valve, to a feed pipe within the supply conduit, nozzles leading from the feed pipe being directed onto the upper part of the swabbing brush within the supply conduit. Other features of the invention will become apparent from the following description.

BRIEF DESCRIPTION OF THE DRAWINGS

In order that preferred embodiments of the invention may be readily understood and carried into practical effect, reference is now made to the accompanying drawings, wherein:

FIG. 1 is a rear elevational view of a tractor-mounted applicator according to the invention, usable particularly for controlling weed growth in orchards, FIG. 2 is a plan view of the apparatus shown in FIG. 1, FIG. 3 is a sectional detail drawing, to larger scale, of a part of the apparatus, FIG. 4 is a sectional view along line 4—4 in FIG. 3, FIG. 5 is a large-scale cross-sectional view of a filament of the apparatus.

DETAILED DESCRIPTION OF THE PREFERRED EMBODIMENTS

Figures 6, 7:
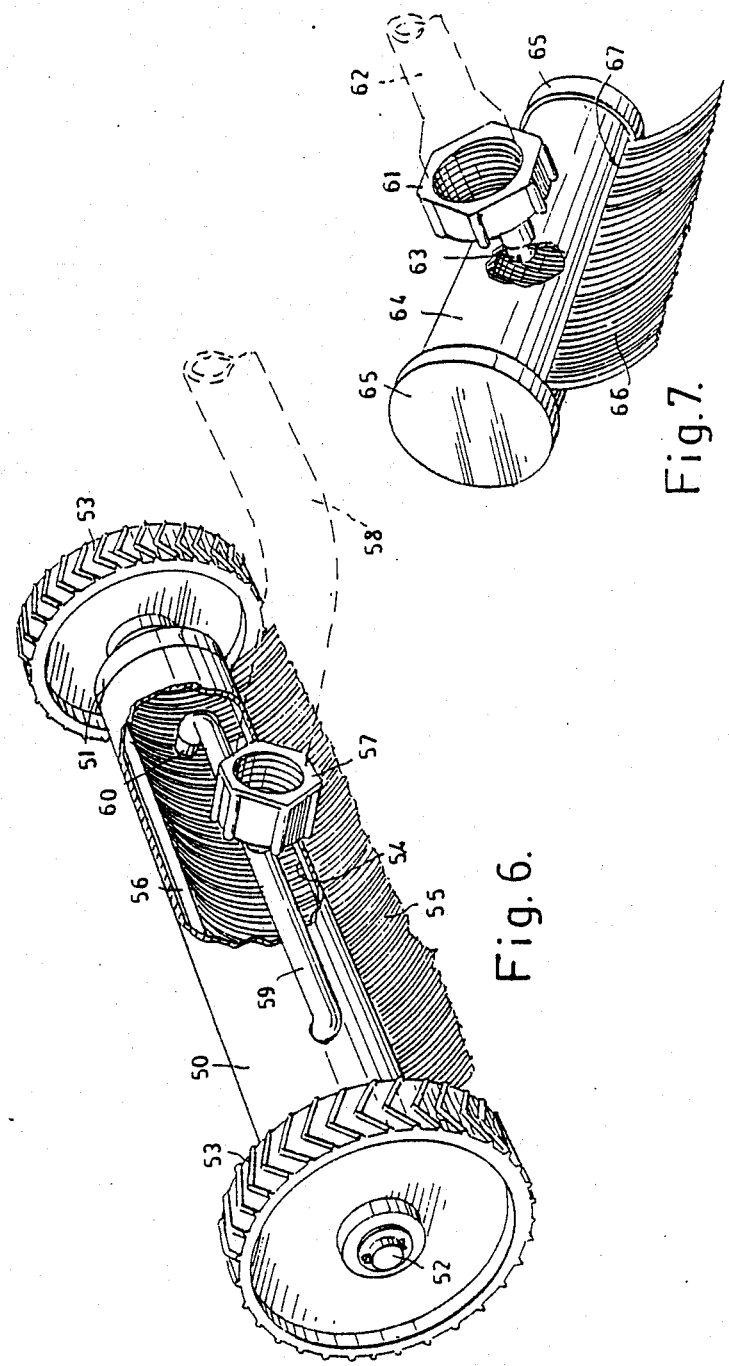
FIG. 6 is a partly broken-away perspective view of an alternative embodiment of the invention usable for the manual application of treating liquid to lawns or the like, and FIG. 7 is a partly broken-away perspective view of a further embodiment of the invention, usable for small-scale application of weedicides or other treating liquids.

Referring initially to FIGS. 1 to 5 inclusive of the drawings, the applicator illustrated includes a rectangular base frame 10 on which is mounted an upright front frame 11 carrying apertured lugs 12 for the attachment of the apparatus to the three-point linkage system (not shown) at the rear of a tractor part of which is indicated in broken outline at 13. A tank 14 for liquid weedicide is mounted in a cradle 15 on the base frame 10, the outlet from the tank being connected through a control valve 16 to a feed hose 17.

A supply tube 18 is connected hingedly to one side of the base frame 10, and normally extends laterally from it, as shown. The supply tube 18 may suitably consist of a length of round-section pipe with a narrow longitudinal division 19 in its normally lowermost part, and, within its upper part, an integrally formed longitudinal holder projection 20, the ends of the tube being closed by an inner cap fitting 21 and an outer cap fitting 22, which may be secured and sealed adhesively. The cap fittings 21 and 22 are axially apertured to accept a feed tube 23 which passes coaxially through the supply tube 18 and is locked in place by a nut 24 screwed onto its inner end and a cap nut 25 screwed onto and closing its outer end. The feed hose 17 is releasably connected to the feed tube 23 by a snap-lock connector 26 of well-known type.

A series of spray nozzles 27 are connected to the feed tube 23 in equally spaced arrangement and are arranged to direct sprays of liquid onto the upper part of a swabbing brush 28. This brush consists of a large number of pliable filaments 29 which may be extruded of a suitable plastics material, preferably to the cruciform cross-section shown in FIG. 5, the filaments being of uniform length and clamped at one end in a channel piece 30 which is slidably engaged and held in the holder projection 20 within the supply tube 18. The swabbing brush 28 extends downwardly within the front part of the supply tube 18, which it leaves through the narrow division 19.

The inner end of the supply tube assembly 18 is connected to the off-side of the base frame 10 by a universal joint indicated generally at 31 (see particularly FIG. 3). This joint includes a pair of arms 32 secured to the front and back of the inner end cap 21 and extending towards the base frame 10. These arms 32 are pivoted by coaxial trunnion bolts 33 to the sides of a U-shaped stirrup 34. The stirrup is fixed on an upright shaft 35 which is rotatable in a bearing block 26 and retained by a nut 37, the block 36 being fixed on the horizontal flange of an angle member 38 mounted on the off-side of the base frame 10.

The supply tube 18 is supported more or less horizontally by a cable 39 connected to the top of an inverted U-shaped standard 40 mounted on the angle member 38, and to an intermediate position on the supply tube. A pair of helical tension springs 41 connected to front and back of the inner end cap 21 of the supply tube 18 are tensioned forwardly and rearwardly and anchored adjustably to the front and rear parts of the angle member 38. Light compression springs 42 in parallel apertures in the bearing block 35 urge bearing balls 43 upwards so that, when the supply tube 18 is in the laterally extending position shown in FIGS. 1 and 2, the bearing balls engage in recesses 44 in the underside of the stirrup 34. Although the supply tube is thus biassed to and held in its laterally extending position, it can be deflected pivotally forwards or back relative to the base frame 10, the balls 43 being depressed by the turning stirrup 34.

A deflector wheel 45 is rotatably mounted on a normally vertical axle 46 secured to and extending up from the outer end cap 22 of the supply tube 18, and extends forwards, outwards and rearwards beyond the outer end of the supply tube assembly.

In use, as the apparatus is moved along an orchard, for example, between rows of trees, the control valve 16 is opened to desired extent so that weedicide from the tank 14 flows from the feed hose 17 into the feed tube 23 and thence is directed through the spray jets 27 onto the upper part of the swabbing brush 28 which is within the supply tube 18. The liquid runs down the filaments 29 which are trailed over the ground to be treated, and in this manner the weedicide is applied with a swabbing action directly to the weeds with little likelihood, in the normal conditions under which the apparatus would be used, of any significant amount of weedicide being airborne. The supply tube 18, if brought against a tree of the orchard, will be deflected rearwards relative to the base frame 10 and the deflector wheel 45 will ensure that the swabbing brush is not trailed against the tree. When the deflector wheel 45 has been moved clear of the three, the supply arm 18 is swung back to initial position by the leading spring 41, the effect of which is damped by the trailing spring 41. When the tractor is to be driven through a gateway, or along a road, the supply tube 18 may be hingedly raised and held in this position by the engagement of any suitable catch 47 on the supply tube with the top of the standard 40.

The embodiment of the invention shown in FIG. 6 will be found suitable for use on a fairly small area such as a lawn. In this form of the invention, a supply tube 50 is closed at its ends by end caps 51 from each of which there extends a stub axle 52 carrying a land wheel 53. Along its bottom part the tube 50 is formed with a longitudinal division 54, and a swabbing brush 55, composed by a large number of filaments as before described, has its upper part secured within a longitudinal holder projection 56 within the upper part of the supply tube, the brush filaments passing closely through the trailing from the bottom division 54. An adaptor nut 57, which is capable of being engaged on the end of the nozzle carrier tube 58 of a knapsack spray (not shown), is connected centrally to a feed pipe 59 which leads to two spray nozzles 60 within the supply tube 50 and directed towards the upper part of the swabbing brush 55. By operation of the knapsack spray trigger (not shown), weedicide from the tank of the knapsack spray is directed, as and when required, to the feed pipe 59 and by way of the nozzles 60 onto the upper part of the swabbing brush, flowing down the filaments of the brush onto a lawn over which the apparatus is propelled. In this way a lawn may be effectively treated with weedicide without danger of wind-borne spray damaging nearby garden plants.

The applicator shown in FIG. 7 is suited to the application of weedicide or other treating liquid to small areas and again has an adaptor nut 61 applicable to the tubular nozzle carrier tube 62 of a knapsack spray or other portable spraying device to connect the device's tank to a single nozzle 63 within a short supply tube 64, closed at its ends by caps 65 and containing the upper part of a swabbing brush 66 which extends through and trails from a longitudinal division 67 in the lower part of the supply tube. This embodiment may be suited, for example, to the eradication of patches of weeds in a paved area or along pathway edges.

The invention is applicable, of course, to the application of liquids other than weedicides. For example, compounds for the treatment of soil against nematodes, or liquid fertilizers and the like, may be applied by apparatus according to the invention.

It should be understood, too, that the particular embodiments of the invention herein described and illustrated may be subject to many minor modifications of construction detail and design, which will be readily apparent to persons skilled in the art without departing from the scope of the invention hereinafter claimed.

I claim:

1. An applicator for agricultural and horticultural treating liquids, said apparatus comprising a supply conduit, a feed means for treating liquid and a swabbing brush which extends down from the supply conduit, which receives treating liquid from said feed means, and which, in opration as the applicator is advanced over an area to be treated, trails over the area to be treated and deposits treating liquid thereon, said swabbing brush comprising a multiplicity of pliable non-absorbent filaments which depend from support means disposed within an upper part of the supply conduit and which pass freely through a slotted aperture in a lower part of the supply conduit, and the feed means comprising a feed tube disposed within said supply conduit and at least one spray nozzle attached to said feed tube, and controllable means for feeding treating liquid under pressure onto the upper parts of the filaments between the support means and the slotted aperture so that the treating liquid descends down the filaments gravitationally.

2. An applicator according to claim 1 wherein:
each of the filaments is of substantially cruciform cross-section.

3. An applicator according to claim 1 further comprising
means for propelling the supply conduit, said propelling means including a base frame for mounting behind a tractor, and
the supply conduit being connected by mounting means to one side of the base frame to extend laterally therefrom.

4. An applicator according to claim 1 wherein:
the supply conduit comprises a tube having closed ends and mounted on coaxial wheels, and said applicator further comprises
means for propelling supply conduit including a liquid supply tube of a portable spraying device releasably connected to the at least one nozzle in the supply conduit.

5. An applicator as claimed in claim 1 wherein the filaments are of uniform cross section and include a longitudinal groove therein.

6. An applicator as claimed in claim 1 further comprising clamping means for clamping the brush filaments at the upper ends thereof, said clamping means comprising a channel which is slidably and removably engaged in said upper part of said supply conduit.

7. An applicator according to claim 3 wherein the mounting means includes:

a pivotal connection of the supply conduit to the base frame permitting angular deflection of the supply conduit forwardly or rearwardly, and means for biasing the supply conduit into, and for releasably holding the supply conduit in, a normal laterally extending position.

8. An applicator according to any claim 3 wherein the mounting means includes:

a pivotal connection of the supply conduit to the base frame permitting the supply conduit to be moved from said laterally extending position to raised travelling position.

9. An applicator according to claim 3 wherein the feed means includes:

a tank for treating liquid disposed on the base frame, a feed tube disposed within the supply conduit and connected to the at least one spray nozzle, and a feed hose connecting the tank to the feed tube by way of a control valve.

10. An applicator according to claim 7 wherein:

a deflector wheel is mounted on the outer end of the supply conduit for rotation about an upright axis to facilitate the clearing of an obstacle by which the supply conduit has been deflected.

* * * * *